(12) United States Patent
Huang et al.

(10) Patent No.: US 9,651,732 B2
(45) Date of Patent: May 16, 2017

(54) LIGHT SOURCE MODULE (71) Applicant: HON HAI PRECISION INDUSTRY CO., LTD., New Taipei (TW)

(72) Inventors: Gwo-Yan Huang, New Taipei (TW); Chien-Liang Chen, New Taipei (TW); Chien-Hsiang Lin, New Taipei (TW); Der-Ho Chi, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 28 days.

(21) Appl. No.: 14/751,783

(22) Filed: Jun. 26, 2015

(65) Prior Publication Data

US 2016/0103274 A1    Apr. 14, 2016

(30) Foreign Application Priority Data

Oct. 14, 2014    (TW) .................................. 103135494

(51) Int. Cl.
| | |
|---|---|
| *F21V 23/00* | (2015.01) |
| *F21V 8/00* | (2006.01) |
| *F21K 9/20* | (2016.01) |
| *F21K 9/61* | (2016.01) |
| *F21Y 105/00* | (2016.01) |
| *F21Y 101/00* | (2016.01) |
| *F21Y 103/10* | (2016.01) |
| *F21Y 115/10* | (2016.01) |

(52) U.S. Cl.
CPC .............. *G02B 6/0073* (2013.01); *F21K 9/20* (2016.08); *F21K 9/61* (2016.08); *G02B 6/0051* (2013.01); *G02B 6/0068* (2013.01); *G02B 6/0083* (2013.01); *G02B 6/0088* (2013.01); *G02B 6/0091* (2013.01); *F21Y 2101/00* (2013.01); *F21Y 2103/10* (2016.08); *F21Y 2105/00* (2013.01); *F21Y 2115/10* (2016.08)

(58) Field of Classification Search
CPC .............. F21Y 2105/00; F21Y 2115/10; F21Y 2103/10; F21K 9/61; F21K 9/20; G02B 6/0051; G02B 6/0073; G02B 6/0083; G02B 6/0088; G02B 6/0091; G02F 1/133615

See application file for complete search history.

(56) References Cited

U.S. PATENT DOCUMENTS

| | | | | | |
|---|---|---|---|---|---|
| 5,070,431 | A | * | 12/1991 | Kitazawa ............. | G02B 6/0021 362/23.15 |
| 7,223,008 | B2 | * | 5/2007 | Henriet ................ | G02B 6/0018 362/602 |
| 7,690,831 | B2 | * | 4/2010 | Mori .................... | G02B 6/0013 362/612 |
| 9,316,381 | B2 | * | 4/2016 | Kweon ............... | F21V 19/0025 |

(Continued)

*Primary Examiner* — Peggy Neils
(74) *Attorney, Agent, or Firm* — Steven Reiss (57) ABSTRACT

A light source module includes a circuit board, a light source electrically coupled to the circuit board including a first light emerging face, a light guide plate close to the light source and including an light incident face, a reflective piece located on one side of the light guide plate, a diffusion plate located on another side of the light guide plate, a frame used to fix the circuit board, the light guide plate, the reflective piece and the diffusion plate. The light incident face and the light emerging face cooperatively forming an angle. Light from the light source is guided by the light guide plate and reflected by the reflective piece and diffused by the diffusion plate.

9 Claims, 6 Drawing Sheets

(56) References Cited

U.S. PATENT DOCUMENTS

2006/0274223 A1* 12/2006 Hsu .................. G02B 6/0031
                                                    349/58
2009/0185393 A1*  7/2009 Kang ................. G02B 6/0073
                                                    362/612
2013/0120995 A1*  5/2013 Sato .................. F21V 21/088
                                                    362/249.02

* cited by examiner

LIGHT SOURCE MODULE

FIELD

The subject matter herein generally relates to a light source module for improving a light efficiency.

BACKGROUND

A light emitting diode (LED) has many advantages, such as cost efficiency, long life, environmentally friendly, and fast starting. The LED is gradually being used as a general light and is further replacing a fluorescent lamp.

BRIEF DESCRIPTION OF THE DRAWINGS

Many aspects of the present disclosure are better understood with reference to the follow drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 1:
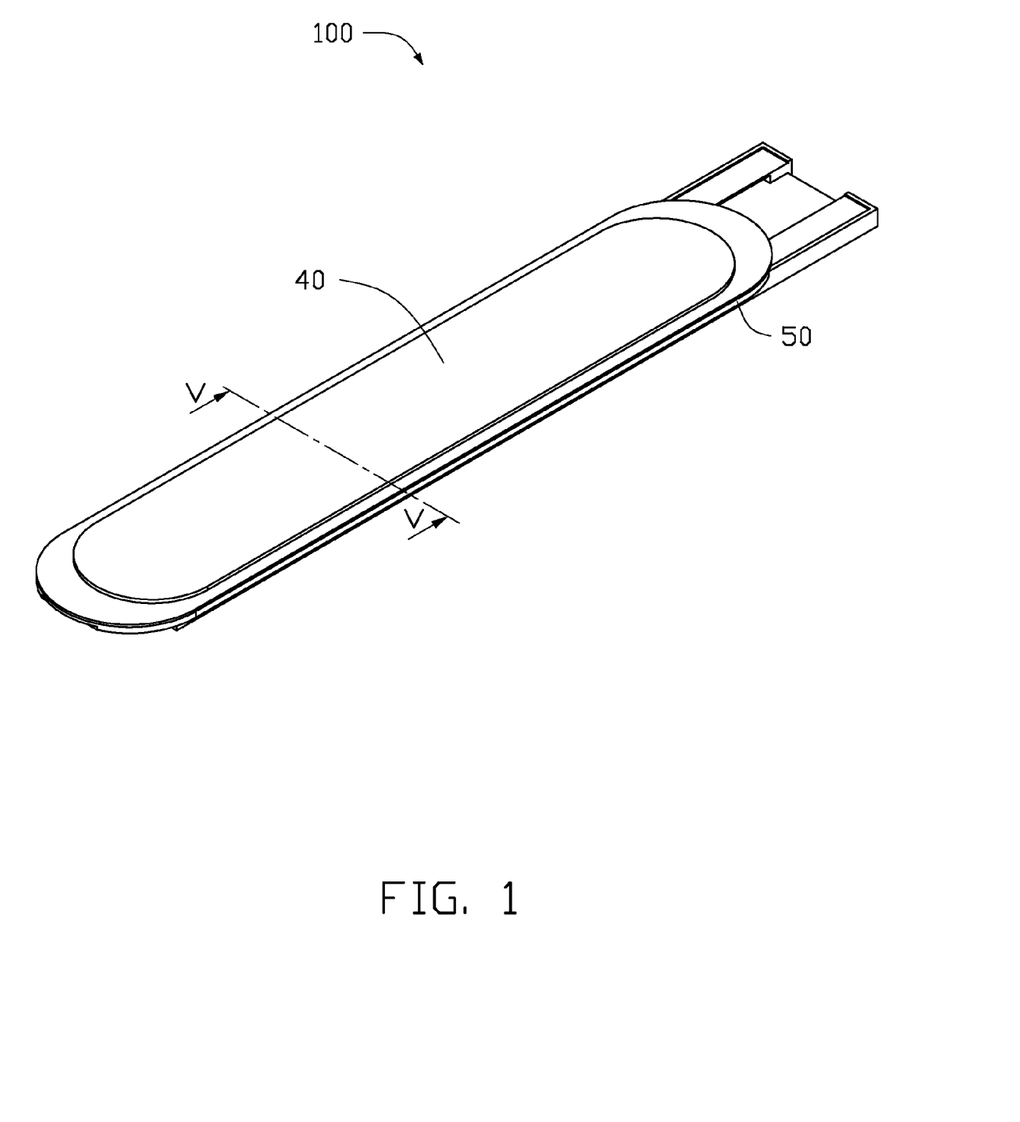
FIG. 1 is an isometric view of an embodiment of a light source module.
Figure 2:
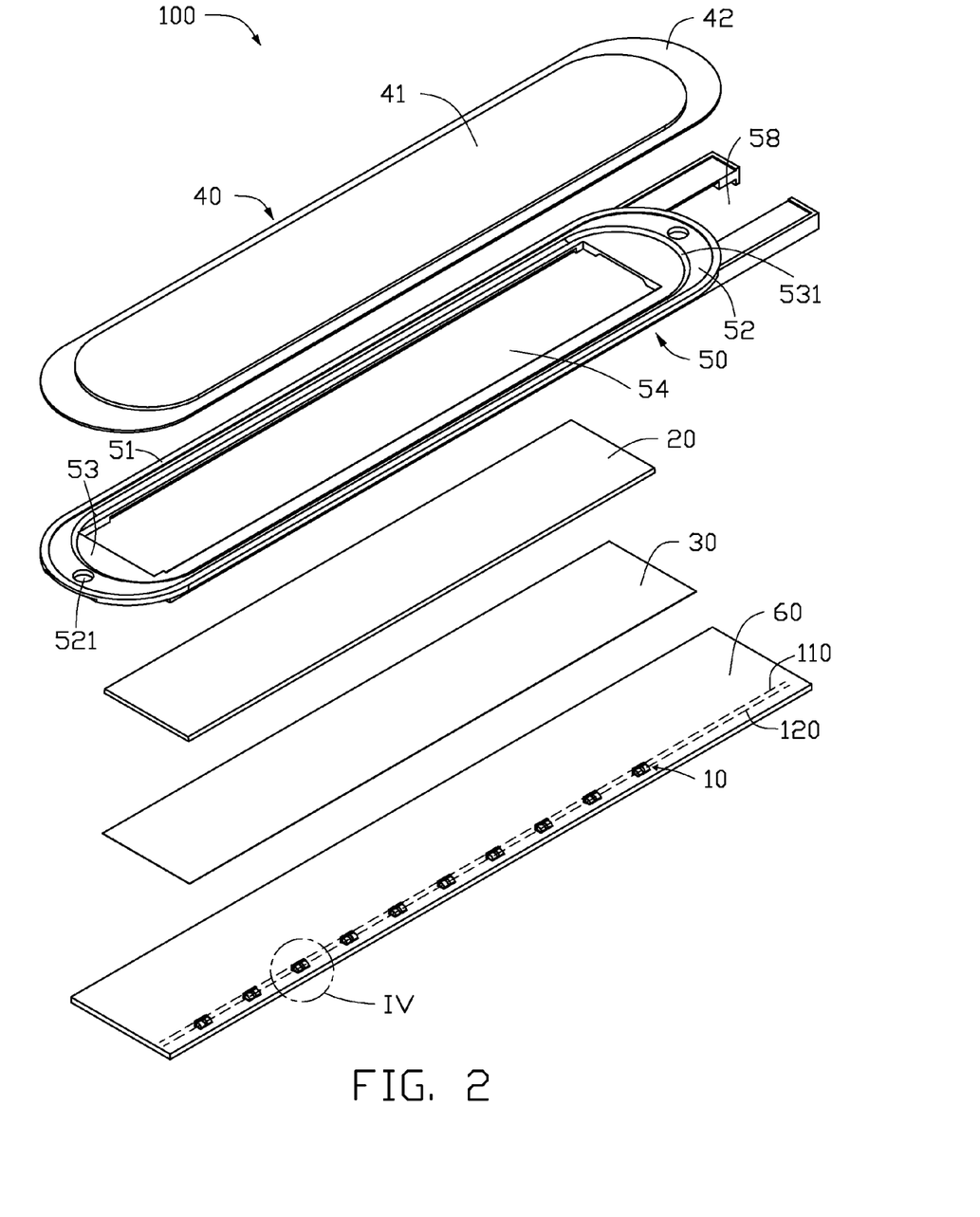
FIG. 2 is an exploded view of the light source module shown in FIG. 1.
Figure 3:
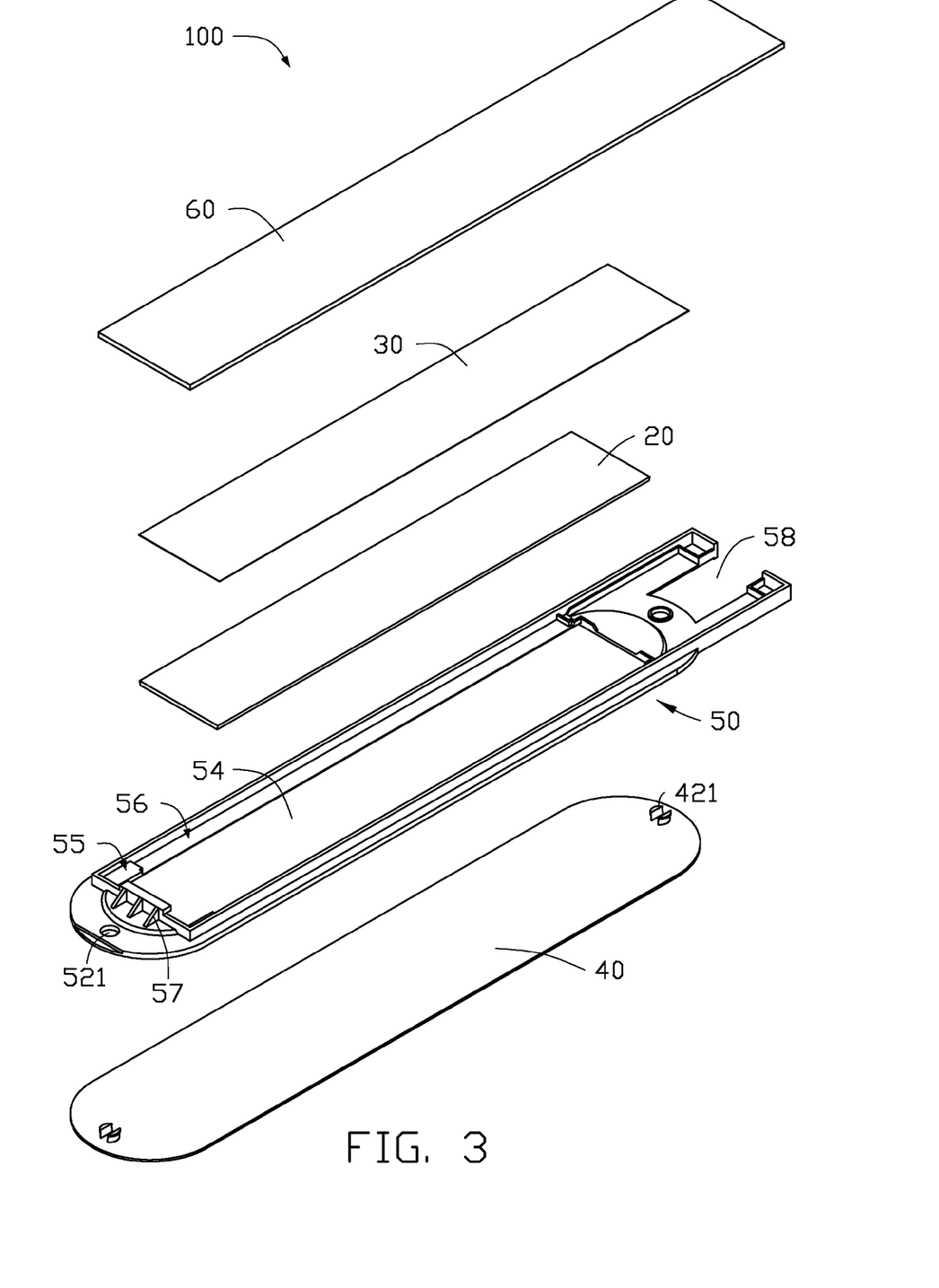
FIG. 3 is similar to FIG. 2, but viewed from another angle.

FIGS. 1-3 illustrate a light source module 100. The light source module 100 can include a circuit board 60, a light source 10 electrically coupled to the circuit board 60, a light guide plate 20, a reflective piece 30, a diffusion plate 40 and a frame 50. The light guide plate 20 can be located on one side of the circuit board 60 close to the light source 10. The reflective piece 30 can be located on one side of the light guide plate 20 close to the circuit board 60. The diffusion plate 40 can be located on another side of the light guide plate 20 away from the circuit board 60. The frame 50 can be used to fix the circuit board 60, the light guide plate 20, the reflective piece 30 and the diffusion plate 40 respectively. The light emitted from the light source 10 can be guided by the light guide plate 20, reflected by the reflective piece 30, and diffused by the diffusion plate 40, such that the light can form a uniform planer light source.

Figure 4:
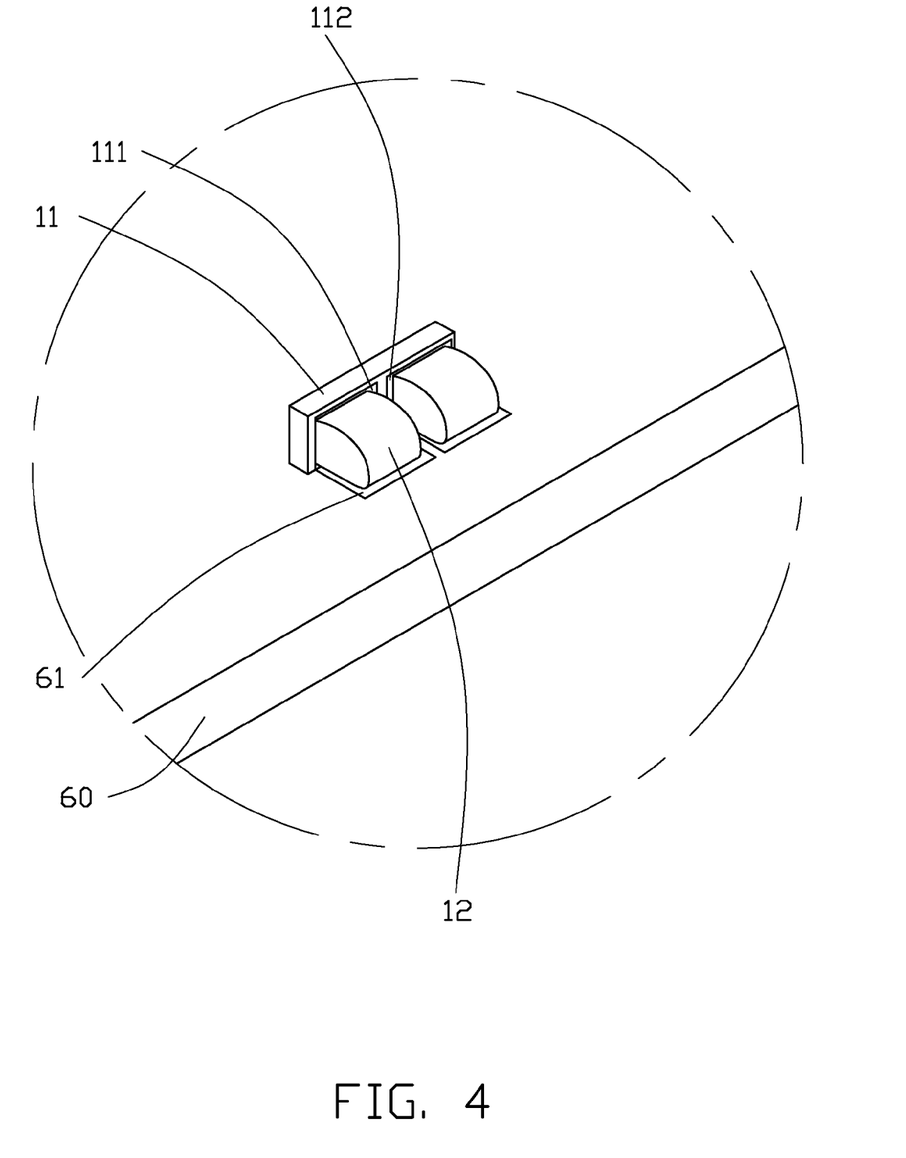
FIG. 4 is an enlarged view taken a circle portion IV of FIG. 2.

FIG. 4 illustrates the light source 10 can include at least one LED 11 electrically coupled to the side of the circuit board 60 close to the light guide plate 20 and at least two soldering tins 12 coupled between the circuit board 60 and the at least one LED 11. The circuit board 60 can further include at least two bonding pads 61 close to the at least one LED 11.

In this embodiment, the number of the at least one LED 11 can be ten and the number of the at least two soldering tins 12 can be twenty. The ten LEDs 11 can be arranged along a predetermined straight line 110 and the twenty soldering tins 12 can be arranged along another predetermined straight line 120 parallel to the predetermined straight line 110. Each LED 11 can be equipped with an anode pin 111 and a cathode pin 112 on one side of each LED 11 close to the edge of the circuit board 60. Each LED 11 can be electrically coupled to the two soldering tins 12 via the anode pin 111 and the cathode pin 112.

One of each two soldering tins 12 can be soldered to the anode pin 111 and one of each two bonding pads 61, and the other of the each two soldering tins 12 can be soldered to the cathode pin 112 and the other of the each two bonding pads 61.

Figure 5:
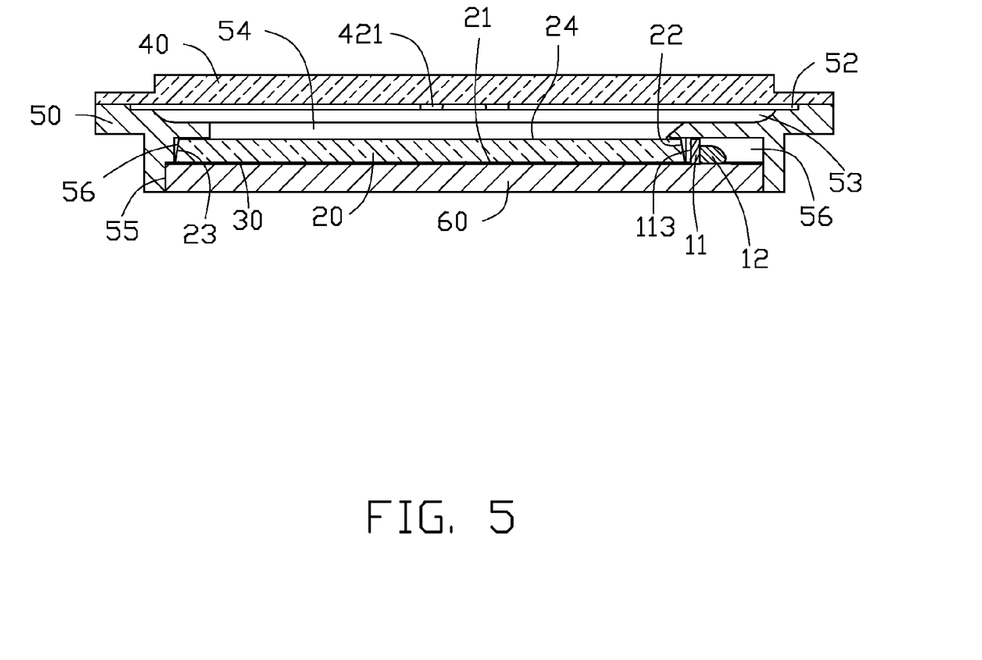
FIG. 5 is a cross sectional view taken along a line V-V line shown in FIG. 1.

FIG. 5 illustrates each LED 11 can have a first light emerging face 113 which is close to the light guide plate 20. When the LEDs 11 are powered on, the light from the LEDs 11 can be emerged from the first light emerging face 113.

Figure 6:
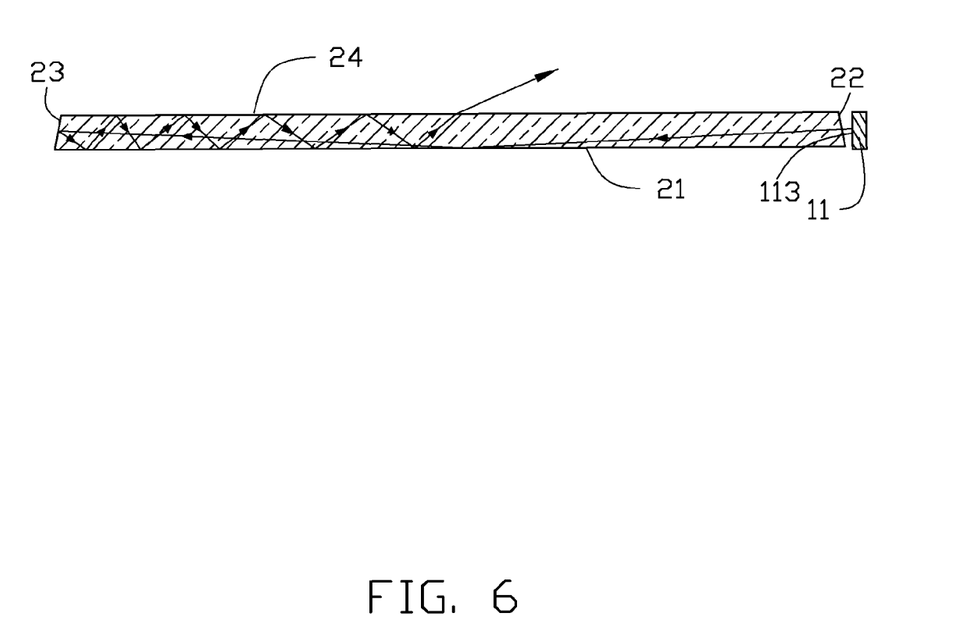
FIG. 6 shows a beam path of a center light from an LED in a light guide plate of the light source module.

FIG. 6 illustrates the light guide plate 20 can be plate-shaped. The light guide plate 20 can include a bottom surface 21, a light incident face 22 coupled with the bottom surface 21, a reflective face 23 coupled with the bottom surface 21 and opposite to the light incident face 22, and a second light emerging face 24 opposite to the bottom surface 21. The light incident face 22 can be slantwise relative to the bottom surface 21. The reflective face 23 can be slantwise relative to the bottom surface 21. The distance between the bottom surface 21 and the at least one LED 11 is not equal to the distance between the second light emerging face 24 and the at least one LED 11. The angle between the light incident face 22 and the first light emerging face 113 can be an acute angle. In this embodiment, the distance between the bottom surface 21 and the at least one LED 11 can be less than the distance between the second light emerging face 24 and the at least one LED 11.

In at least one embodiment, the distance between the bottom surface 21 and at least one LED 11 can be greater than the distance between the second light emerging face 24 and the at least one LED 11.

FIG. 5 illustrates the reflective piece 30 can be close to the bottom surface 21 of the light guide plate 20. The light emitted by the at least one LED 11 can be reflected by the reflective piece 30.

FIGS. 2 and 6 illustrate the diffusion plate 40 can include a diffusion portion 41 which is close to the second light emerging face 24 of the light guide plate 20 and an installation portion 42 around the diffusion portion 41. The light emerging from the second light emerging face 24 can be diffused by the diffusion portion 41 to form a uniform light source. FIG. 3 illustrates the installation portion 42 can include at least one buckle 421 close to the frame 50. In this embodiment, the number of the at least one buckle 421 can be two, and the two buckles 421 can be located on two ends of the installation portion 42.

FIG. 2 illustrates the frame 50 can have a top surface 51. A first accommodating space 52 can be defined on the top surface 51. The first accommodating space 52 can be annular-shaped. At least one through-hole 521 can be defined in the first accommodating space 52 corresponding to the at least one buckle 421. In this embodiment, the number of the at least one buckle 421 can be two. A compression groove 53 can be defined on the frame 50 The compression groove 53 and the first accommodating space 52 can cooperatively form a chamfer 531. The light emerging from the light guide plate 20 can pass the compression groove 53 and further enter into the diffusion plate 40. A through groove 54 can be defined throughout the frame 50 in the compression groove 53. FIG. 3 illustrates a second accommodating space 55 can be defined opposite to the top surface 51. A third accommodating space 56 can be defined connected to the through groove 54 in the second accommodating space 55. In this embodiment, the number of the third accommodating spaces 56 can be two, and the two third accommodating spaces can be located on two sides of the through groove 54.

In this embodiment, the frame 50 can have a conducting portion 57 close to the third accommodating space 56. The circuit board 60 can be electrically connected to an external power via the conducting portion 57, such that the external power can power the at least one LED 11. A groove 58 can be defined opposite to the conducting portion 57. The light source module 100 can be fixed to an external module via the groove 58.

FIGS. 3 and 5 illustrate when in assembly, the reflective piece 30 can be located between the bottom surface 21 of the light guide plate 20 and the circuit board 60. The light incident face 22 of the light guide plate 20 can be located close to the at least one LED 11. The circuit board 60 and the light guide plate 20 can be received in the second accommodating space 55. The light guide plate 20 can be received in the third accommodating space 56. The buckle 421 of the diffusion plate 40 can be received into the through-hole 521.

FIGS. 5-6 illustrate when in use, the circuit board 60 can be electrically coupled to the external power. The light emitted from the at least one LED 11 can emerge from the first light emerging face 113 and then be refracted into the light guide plate 20 via the light incident face 22, and then reflected by the reflective piece 30, the reflective face 23, and then emerge from the second light emerging face 24, and then be diffused by the diffusion plate 40. A center light from the at least one LED 11 can be emitted from the light guide plate 20 via light incident face 22 and the second light emerging face 24.

In at least one embodiment, the number of the at least one LED 11 can be but not limited to ten, and the number of the soldering tins 12 can be but not limited to twenty.

In at least one embodiment, the diffusion plate 40 can be fixed to the frame 50 by screws.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A light source module comprising;
  a circuit board;
  a light source, the light source electrically coupled to the circuit board and having a first light emerging face;
  a light guide plate, the light guide plate positioned close to the light source and having a light incident face, the light incident face and the first light emerging face cooperatively forming an acute angle;
  a reflective piece located on one side of the light guide plate proximate to the circuit board;
  a diffusion plate located on another side of the light guide plate away from the circuit board; and
  a frame fixedly holding the circuit board, the light guide plate, the reflective piece, and the diffusion plate, respectively;
  wherein, light emitted from the light source is guided by the light guide plate, reflected by the reflective piece and diffused by the diffusion plate to form a uniform planer light source; and
  wherein the light source comprises at least one LED electrically coupled to the circuit board and at least two soldering tins located between the circuit board and the at least one LED; the circuit board further comprises at least two bonding pads close to the at least one LED; each LED comprises an anode pin, a cathode pin and two sides, the first light emitting face is on one side of each LED, and the anode pin and the cathode pin is on the opposite side of each LED facing away the first light emitting face; each LED is electrically coupled to the at least two soldering tins through the anode pin and the cathode pin; one of the at least two soldering tins is soldered to the anode pin and one of the at least two bonding pads; and the other soldering tin of the at least two soldering tins is soldered to the cathode pin and the other bonding pad of the at least two bonding pads; and the side of each LED positioning the anode pin and the cathode pin of each LED is perpendicular to the two bonding pads.

2. The light source module of claim 1, wherein the at least one LED is arranged along a predetermined straight line, and the at least two soldering tins are arranged along another predetermined straight line parallel to the predetermined straight line.

3. The light source module of claim 1, wherein the light guide plate comprises a bottom surface, a reflective face opposite to the light incident face, and a second light emerging face opposite to the bottom surface; the light incident face is slantwise relative to the bottom surface; a distance between the bottom surface and the at least one LED is not equal to a distance between the second light emerging face and the at least one LED.

4. The light source module of claim 3, wherein the angle between the light incident face and the bottom surface is acute; the distance between the bottom surface and the at least one LED is less-than the distance between the second light emerging face and the at least one LED.

5. The light source module of claim 4, wherein the frame has a top surface, a first accommodating space is defined on the top surface, a through groove is defined throughout the frame in the first accommodating space, a second accommodating space is defined opposite to the top surface, a third accommodating space is defined in the second accommodating space; the diffusion plate comprises a diffusion portion and an installation portion coupled to the diffusion portion, the installation portion includes a buckle close to one side of the frame, the frame defines a through-hole corresponded to the buckle in the first accommodating space; the diffusion plate fixed to the frame by the buckle and the through-hole, the light guide plate is received in the third accommodating space, the circuit board is housed in the second accommodating space, the third accommodating space is connected to the through groove.

6. The light source module of claim 5, wherein the number of the buckle is two, the number of the through-hole is two, and the buckles is located on two ends of the installation portion.

7. The light source module of claim 5, wherein a compression groove is defined in the bottom of first accommodating space, the compression groove and the first accommodating space cooperatively form a chamfer.

8. The light source module of claim 5, wherein the frame has a conducting portion close to the third accommodating space, the frame defines a groove far away from the conducting portion; the circuit board is configured to electrically connected to an external power through the conducting portion, and the light source module is configured to be fixed to an external module through the groove.

9. The light source module of claim 3, wherein a center light from the at least one LED is emitted from the light guide plate through the light incident face and the second light emerging face.

* * * * *